(12) United States Patent
Chang (10) Patent No.: US 11,019,042 B1
(45) Date of Patent: May 25, 2021

(54) DATA ASSISTED KEY SWITCHING IN HYBRID CRYPTOGRAPHY

(71) Applicant: NORTHROP GRUMMAN SYSTEMS CORPORATION, Falls Church, VA (US)

(72) Inventor: Rick G. Chang, Santee, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 462 days.

(21) Appl. No.: 15/934,483

(22) Filed: Mar. 23, 2018

(51) Int. Cl.
  *H04L 9/32* (2006.01)
  *H04L 29/06* (2006.01)
  *H04L 9/30* (2006.01)
  *H04L 9/08* (2006.01)

(52) U.S. Cl.
  CPC .......... *H04L 63/045* (2013.01); *H04L 9/0825* (2013.01); *H04L 9/30* (2013.01)

(58) Field of Classification Search
  CPC ....... H04L 63/045; H04L 9/30; H04L 9/0825; H04L 9/16; H04L 9/32; H04L 63/0457; H04L 9/065; H04L 9/0643; H04L 63/12; H04L 63/123; G06F 21/6209
  See application file for complete search history.

(56) References Cited

U.S. PATENT DOCUMENTS

| 2003/0033537 | A1* | 2/2003 | Fujimoto | G06F 21/123 713/193 |
| 2003/0235307 | A1* | 12/2003 | Miyamoto | H04L 9/14 380/269 |
| 2004/0081320 | A1* | 4/2004 | Jordan | H04W 12/0401 380/247 |
| 2011/0213957 | A1* | 9/2011 | Tsai | H04L 9/3234 713/153 |
| 2016/0149867 | A1* | 5/2016 | Lohr | H04L 63/0428 380/256 |
| 2016/0182231 | A1* | 6/2016 | Fontecchio | H04L 9/3239 713/172 |
| 2020/0162434 | A1* | 5/2020 | Tang | H04L 65/608 |

* cited by examiner

*Primary Examiner* — Amie C. Lin
(74) *Attorney, Agent, or Firm* — John A. Miller; Shumaker, Loop & Kendrick, LLP (57) ABSTRACT

A method and system for encrypting and decrypting data messages which are communicated between two devices. The method for encrypting/decrypting data messages uses hybrid symmetric/asymmetric encryption, where symmetric encryption is used for data records and asymmetric encryption is used to encode new symmetric keys. All data records and symmetric key data are sent in a single data stream. The method allows the data producer to create a new symmetric key at any desired time, and also allows the data consumer to recover symmetric keys needed for decryption, on the fly by using the cipher text data stream itself, as the data messages are consumed. Data consumption can be at a later time and independent of production, and symmetric keys need not be shared between producer and consumer in advance.

19 Claims, 6 Drawing Sheets

DATA ASSISTED KEY SWITCHING IN HYBRID CRYPTOGRAPHY

BACKGROUND

Field

This present disclosure relates generally to a method for encrypting and decrypting data messages and, more particularly, to a method for encrypting/decrypting data messages which uses hybrid symmetric/asymmetric encryption, allows the data producer to create a new symmetric key at any desired time, and allows the data consumer to recover symmetric keys needed for decryption, on the fly by using the cipher text data stream itself, as the data messages are consumed.

Discussion

In its basic form, encryption means taking plain text and converting it to cipher text using the same key, or secret, to encrypt and decrypt the text. This is known as symmetric encryption (because the same key is used both ways) and it is comparatively fast compared to other types of encryption such as asymmetric encryption. The main disadvantage of symmetric key cryptography is that all parties involved have to exchange the key used to encrypt the data before they can decrypt it. This requirement to securely distribute and manage large numbers of keys means most cryptographic services also make use of other types of encryption algorithms.

Asymmetric cryptography, also known as public key cryptography, uses public and private keys to encrypt and decrypt data. The keys are simply large numbers that have been mathematically paired together but are not identical (that is, they are asymmetric). One key in the pair can be shared with everyone; it is called the public key. The other key in the pair is kept secret; it is called the private key. Either of the keys can be used to encrypt a message; the opposite key from the one used to encrypt the message is used for decryption.

Hybrid encryption is a mode of encryption that merges asymmetric and symmetric encryption to benefit from the strengths of each form of encryption. Hybrid encryption is achieved through data transfer using unique session keys along with symmetrical encryption. Public key encryption is implemented for random symmetric key encryption. The recipient then uses the public key encryption method to decrypt the symmetric key. Once the symmetric key is recovered, it is then used to decrypt the message. Hybrid encryption is considered a highly secure type of encryption as long as the private key is fully secure.

It is a best practice for data producer devices to create new symmetric keys periodically, so that no symmetric key will be kept in usage between device power cycles or kept in usage for an extended continuous period of time. This can present problems for the data consumer—namely, knowing when the symmetric key has been changed, and knowing what the new symmetric key is. This can be even more challenging when data producer and consumer handle data at entirely different time frames and the producer decides to change the symmetric key at will.

SUMMARY

The present disclosure describes a method and system for encrypting and decrypting data messages from a data producer to a data consumer. Communication between two devices will have two independent sessions in each direction. The method for encrypting/decrypting data messages uses hybrid symmetric/asymmetric encryption, where symmetric encryption is used for data records and asymmetric encryption is used to encode new symmetric keys. All data records and symmetric key data are sent in a single data stream. The method allows the data producer to create a new symmetric key at any desired time, and also allows the data consumer to recover symmetric keys needed for decryption, on the fly by using the cipher text data stream itself, as the data messages are consumed. Data consumption can be at a later time and independent of production, and symmetric keys need not be shared between producer and consumer in advance.

Additional features of the presently disclosed methods and systems will become apparent from the following description and appended claims, taken in conjunction with the accompanying drawings.

DETAILED DESCRIPTION OF THE EMBODIMENTS

The following discussion of the embodiments of the disclosure directed to a system and method for data assisted key switching in hybrid cryptography is merely exemplary in nature, and is in no way intended to limit the disclosed techniques or their applications or uses.

Message encryption may be used in any situation where two parties are communicating over a potentially insecure communications channel (such as the Internet, a Wi-Fi network, a cellular network, etc.) and do not wish for any other party to "listen in" or intercept the messages.

Figure 1:
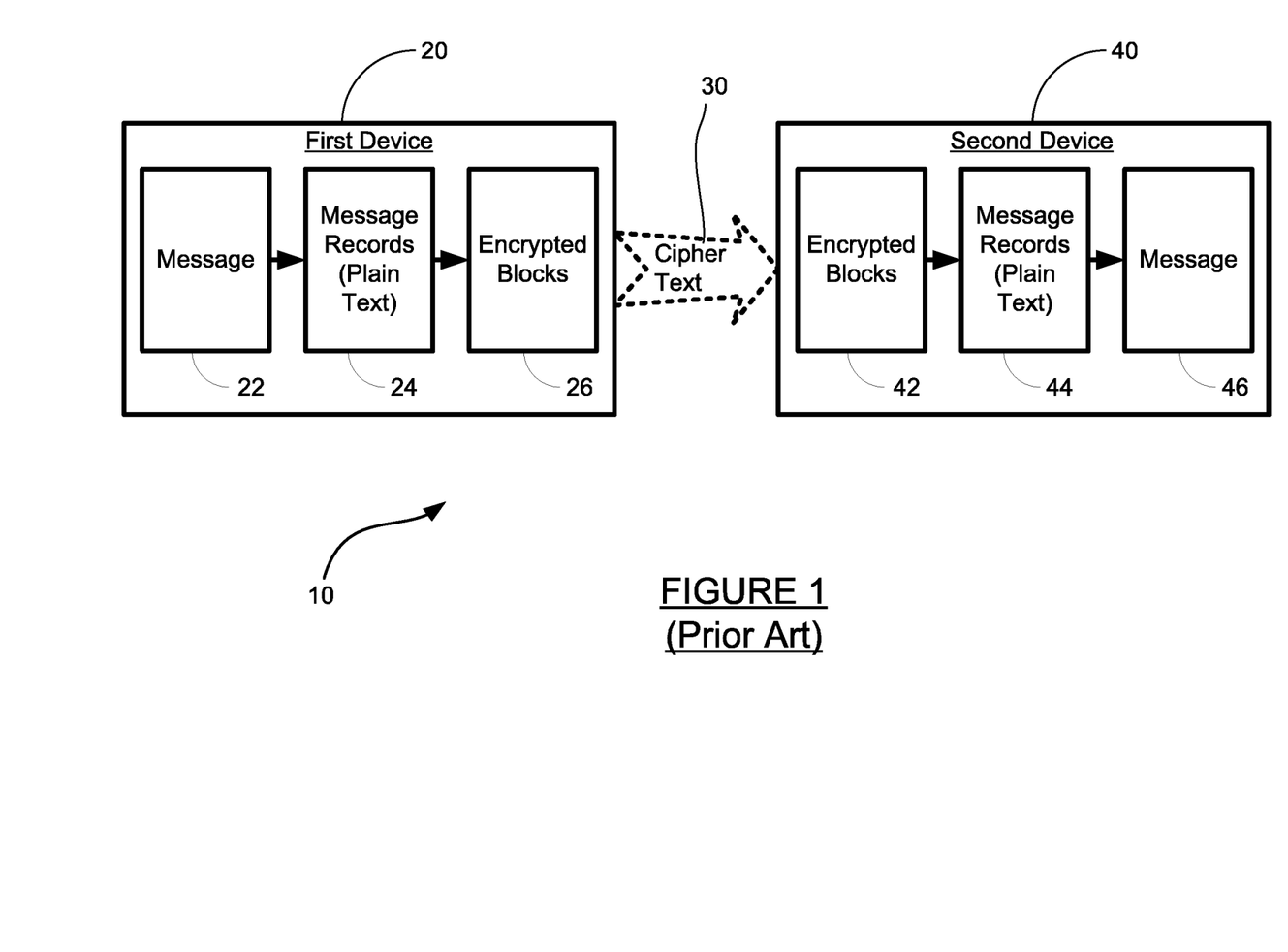
FIG. 1 is an illustration of two devices communicating using encrypted communications, as known in the art.

FIG. 1 is an illustration 10 of two devices communicating using encrypted communications. In the illustration 10, one-way communications are depicted from a first device 20 to a second device 40. The embodiments of the methods and systems discussed below are equally applicable to two-way communications, and to multi-party communications.

In this scenario, the first device 20 desires to send a message to the second device 40 over a communications channel 30. Because the communications channel 30 may not be secure, encrypted communications are to be used. It is to be understood that the devices 20 and 40 represent some combination of a computer or server, a mobile phone, a vehicle or aircraft, etc., and that any such device includes a processor capable of generating a data message to be sent, encrypting said message, decrypting said message, processing said message after receipt and acting upon it, etc. In fact, the devices 20 and 40 can be considered to be the processors themselves. Furthermore, it is to be understood that the devices 20 and 40 include communications systems (transmitter/receiver) capable of sending and receiving data streams over the communications channel 30.

In the scenario shown in the illustration 10, the device 20 creates a message 22 which it wishes to send to the device 40. The message 22 in this case contains plain text. The message 22 may be any suitable type of message which can be sent from one device to another—including, but not limited to, data from an unmanned aerial vehicle (UAV) to be delivered to a base station, data from a vehicle to be delivered to a server or vice versa, etc. The processor on the device 20 first breaks the message 22 up into fixed-size records 24. The message records 24 are then encrypted into cipher text blocks 26 using block cipher techniques.

After encryption by the processor in the device 20, the message 22 is no longer records of plain text, but rather is now blocks of cipher text. The cipher text is sent over the communications channel 30 to the device 40. The actual transmission of the cipher text to the device 40 may occur at a later time—such as hours or days after the message creation and encryption by the device 20. The processor on the device 40 decrypts the cipher text blocks 42 which it receives in the data stream over the communications channel 30. After decryption, plain text message records 44 are present on the second device 40, and the message itself (message 46) can be recovered therefrom. The preceding discussion of FIG. 1 uses techniques known in the art, and is provided simply as a foundation for the following explanation of the embodiments of the methods and systems for data assisted key switching according to the present disclosure.

In the detailed discussion of the disclosed methods which follows, data collected over time by a data producer (first device) is written to a file and protected by hybrid cryptography before sending over a communications channel, which may use any wired or wireless technology. When the file is retrieved for analysis by a consumer (second device), the raw data stream in this file appears to be random from a third party point of view. The communication (the actual transfer of the cipher text data stream) from the producer to the consumer may occur at a time much later than when the message was created and encrypted by the producer—for example, many hours later. This means that the key recovery must be performed during decryption.

The combination of encryption methods into a hybrid method has various advantages. One is that a connection is established between two users' sets of equipment. Users then have the ability to communicate through hybrid encryption. Asymmetric encryption can slow down the encryption process as it requires a larger key size to achieve the same strength, but with the simultaneous use of symmetric encryption, both forms of encryption are enhanced. The result is the added security of the transmittal process along with overall improved system performance. The disclosed methods for data assisted key switching offer a great benefit for a data producer and a data consumer to efficiently encrypt/decrypt data and yet to avoid sharing the symmetric key in advance. Moreover, the disclosed methods enable the convenience of using a single communications channel.

An important feature of the disclosed methods is that cipher text from both asymmetric and symmetric cryptography is placed in the same, single data stream communicated from the producer to the consumer. A separate data channel or stream for key data is not needed, and symmetric keys need not be shared in advance. The cipher text data stream is parsed by the consumer, using logic discussed in detail below, to identify any new symmetric key data sent by the producer. Thus, the idea of data assisted key switching is that the cipher data stream itself is used to identify and decode a symmetric key change. As discussed below, the logic for differentiating the actual message data from symmetric key data can be as simple as "if a record is not identifiable data after symmetric decryption, it must be a key data block", in which case asymmetric decryption is then applied to recover the new symmetric key.

Figure 2:
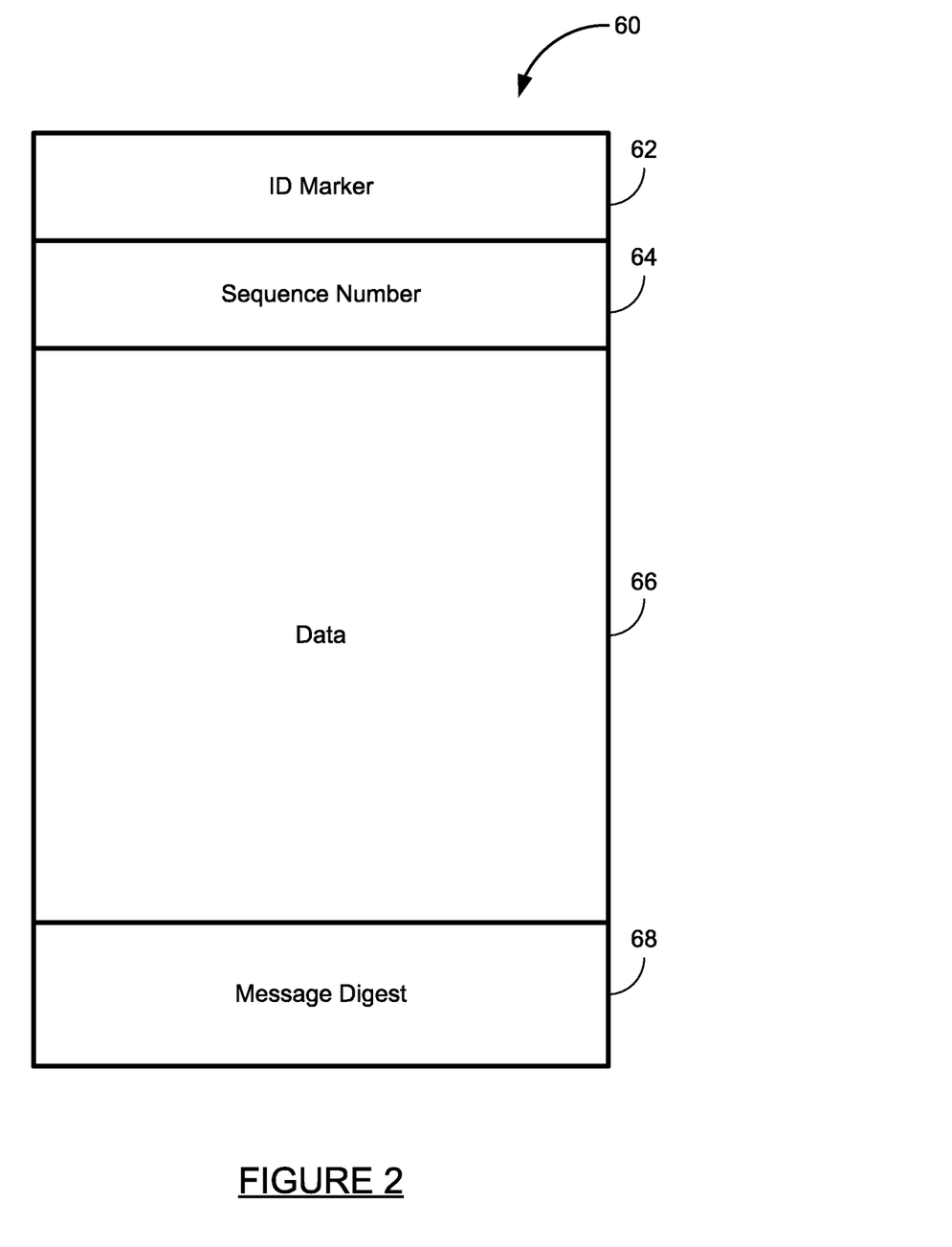
FIG. 2 is an illustration of a simple example of a data record.

The disclosed methods use block cipher techniques. In order for the data consumer to effectively process the incoming cipher text data stream into either message data or symmetric key data, it is necessary for a standard data record schema to be defined which is used by both the producer and consumer. FIG. 2 is an illustration of a simple example of a data record 60 as may be used in the disclosed methods. The record 60 must have a predefined fixed size, such as 512 bytes for example. The record 60 must also have a predefined structure or schema. The record 60 illustrated here includes four fields.

An ID Marker 62 is the first field in the record 60. The ID Marker 62 contains a number or character string which makes the record 60 recognizable by the consumer as a record to be processed. The ID Marker 62 could contain real words, such as "Project 999 Data Record", or it could contain a randomly generated number or hexadecimal string, such as "A9250587CE". The ID Marker 62 is the same for each record, but can be changed by the data producer from time to time, as long as the consumer knows the new value of the ID Marker 62. A sequence number 64 is simply a value, normally numeric, which may be incremented from one data record to the next, for example. The sequence number 64 gives each data record a unique identity, and provides sequential context for ensuring that the data records are reconstructed in the proper order after decrypting by the consumer.

A data field 66 includes the actual message data which is to be delivered from the producer to the consumer. Thus, the data field 66 may include, for example, 220 characters of text data. When the data producer wants to create a message for the consumer, the producer places the plain text message data into as many of the records 60 as needed to contain the message. In other words, a single message including a lot of data may extend across hundreds or thousands of data records. Finally, a message digest 68 includes a digest, or hash of the record 60. As understood in the art, a message digest is a cryptographic hash function containing a string of digits created by a one-way hashing formula. Message digests are designed to protect the integrity of a piece of data to detect changes or alterations to any part of a message. Any suitable type of digest, such as MD5, SHA-1 or SHA-2, may be used for the message digest 68 in the record 60.

As mentioned above, the size and schema of the record 60 are known to both the producer and the consumer. This process of using a known record schema makes the cipher text data identifiable upon decryption by the consumer. Stronger identification cues decrease the chances of the consumer mistaking new symmetric key info as actual message data.

With the data record 60 defined and standardized as described above, a data assisted key switching technique can be implemented for hybrid cryptography, as discussed below.

Figure 3:
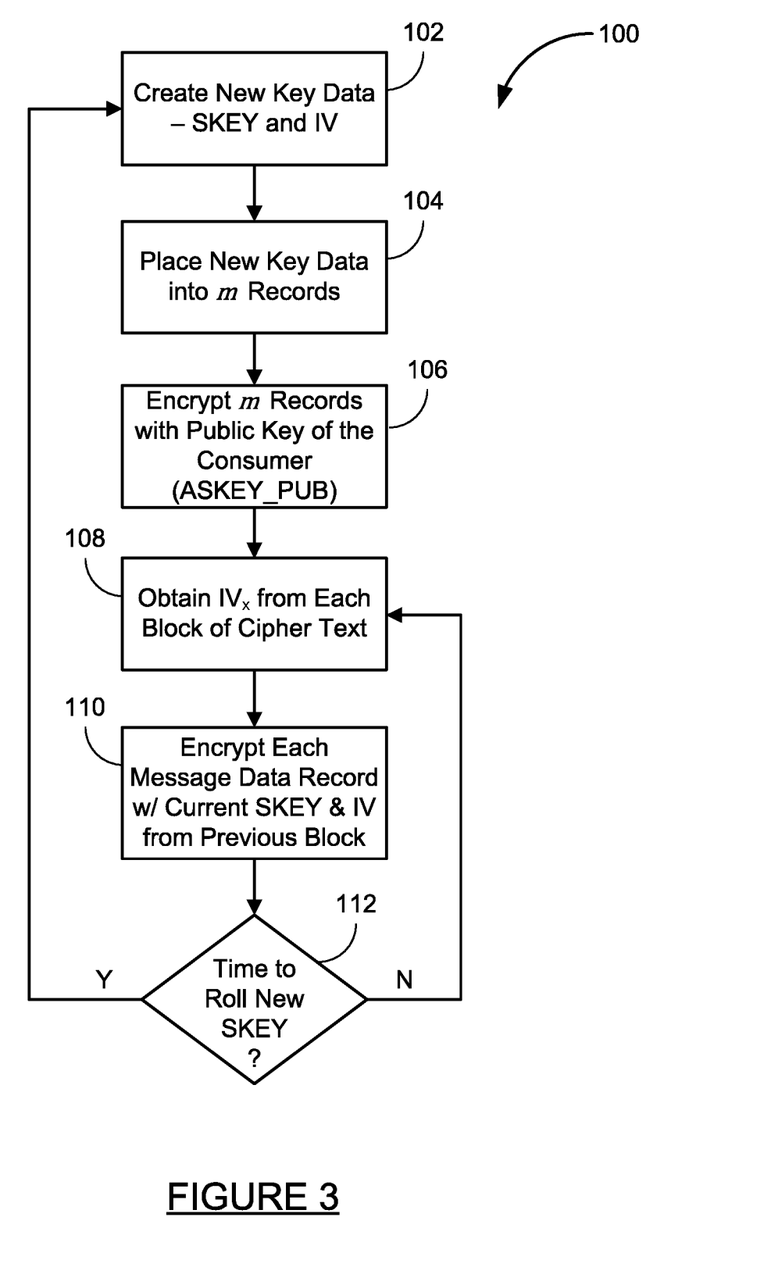
FIG. 3 is a flowchart diagram of a method used by a data producer for encrypting a data stream to send to a consumer, where the data stream includes a change of symmetric keys, according to an embodiment of the present disclosure.
Figure 4:
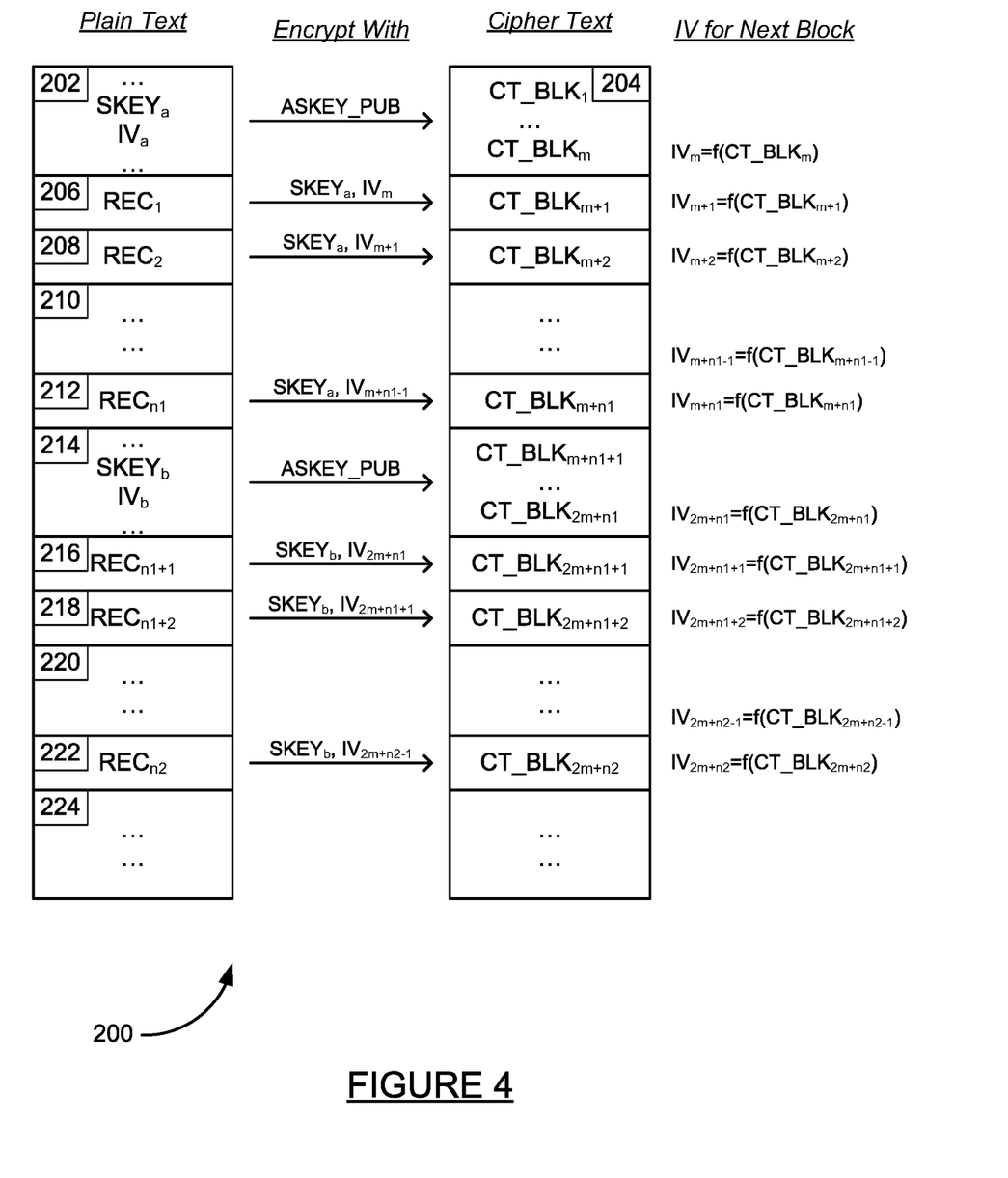
FIG. 4 is a block diagram of an encryption scheme used by the data producer in the method of FIG. 3, according to an embodiment of the present disclosure.

FIG. 3 is a flowchart diagram 100 of a method used by the data producer for encrypting a data stream to send to the consumer, where the data stream includes a change of symmetric keys, and FIG. 4 is a block diagram 200 of an encryption scheme used by the data producer in the method of FIG. 3, according to embodiments of the present disclosure.

As discussed above, the disclosed methods use hybrid encryption—where asymmetric cryptography is used to encrypt/decrypt symmetric key data, and symmetric cryptography is used to encrypt/decrypt message data records. An example of the symmetric cryptography that may be used is Advanced Encryption Standard (AES), and an example of the asymmetric cryptography that may be used is Rivest-Shamir-Adleman (RSA).

At box 102, when the producer wants to create and encrypt a message, the process begins with the producer creating a new symmetric key (SKEY) and an initialization vector (IV). The symmetric key is used both for encryption and decryption, as discussed above. The initialization vector is an arbitrary number that is used along with the symmetric key for data encryption. The IV is typically required to be random and unique (only used once) for each session. The first IV for a session may be rolled out in a random manner. Subsequent IVs within a session are computed as a function of the previous cipher text block, as discussed below.

At box 104, the new session key data (SKEY$_a$ and IV$_a$) are placed into data records such as the record 60 discussed above. This is shown at block 202 of FIG. 4. Other values besides SKEY$_a$ and IV$_a$ may also be included in the session key data records. For example, a new ID Marker string for the data records may be defined, or a new record schema may be defined. If a new record schema, or a new attribute for any part of the record schema, is included in the session key data in the block 202, these schema and/or attributes are used for the upcoming symmetric encryption session until changed again in a later session key block.

The session key data may be larger than the record size, in which case the session key data are placed into more than one record. The number of records required to contain the session key data is defined as an integer m, where m may have a value of three, for example. The value of m is known to both the producer and the consumer in advance.

At box 106, the m records of session key data are encrypted with the asymmetrical public key (ASKEY_PUB) of the consumer. The result of this is shown at block 204 of FIG. 4, containing cipher text blocks 1 through m (CT_BLK$_1$-CT_BLK$_m$). At box 108, an initialization vector is computed from the previous cipher text block. This is shown to the right of the block 204 in FIG. 4, where the initialization vector IV$_m$ for the previous cipher text block CT_BLK$_m$ is computed using the function $f$ as discussed above. To summarize what has happened so far—new symmetric session key data has been "rolled" or created by the producer, the session key data has been asymmetrically encrypted using the public key of the consumer, and the resulting cipher text placed in m blocks in the cipher text stream. The initialization vector to be subsequently used has also been computed.

At box 110, the producer begins symmetrically encrypting actual message data records. The message data will typically extend across many records. The first record REC$_1$—shown at block 206 of FIG. 4—is encrypted using the current symmetric key (SKEY$_a$) and the initialization vector (IV$_m$) from the previous cipher text block. This results in the cipher text block CT_BLK$_{m+1}$, from which the next initialization vector (IV$_{m+1}$) is computed. The second record REC$_2$—shown at block 208 of FIG. 4—is encrypted using the current symmetric key (SKEY$_a$) and the initialization vector (IV$_{m+1}$) from the previous cipher text block. This results in the cipher text block CT_BLK$_{m+2}$, from which the next initialization vector (IV$_{m+2}$) is computed. This process of computing the next initialization vector and encrypting the next message data record (block 210) continues until the message is complete or the producer determines that a new session key should be rolled. This is shown at decision diamond 112 where, if a new session key is not to be created, the process loops back to the box 108.

As indicated above, if message creation is a periodic event (not continuous), the message from the producer may come to an end. For example, the message may indicate that some event has occurred and data about the event is to be written to a log. In such a case, after every message (log entry) is complete, it may be desirable to roll a new symmetric key. Other triggers may also be used to dictate creating new symmetric key data—such as a predefined amount of time has elapsed for the current session, or a device has been power cycled (off/on). The number of message data records included by the producer in the first session is defined as n1, and the final record REC$_{n1}$ is shown at block 212 of FIG. 4.

Regardless of the reason for ending the first session, when the producer determines that it is time to roll a new symmetric (session) key, the process returns from the decision diamond 112 to the box 102. This is shown at block 214 in FIG. 4, where new session key data (SKEY$_b$ and IV$_b$—and optionally other values as discussed above) are placed into data records. The number of data records needed to hold the new session key data is still the same number m as for the first session. As before, the m records of session key data are encrypted with the asymmetrical public key (ASKEY_PUB) of the consumer. The result of this is shown in FIG. 4, as the cipher text blocks CT_BLK$_{m+n1+1}$ through CT_BLK$_{2m+n1}$). The new session key data has now been encrypted and placed into the cipher text data stream.

An initialization vector IV$_{2m+n1}$ is then computed from the previous cipher text block. The subscript 2m+n1 derives from the fact that two session keys have now been placed into the cipher text data stream, each having m blocks, plus the number of data records n1 contained in the first session.

Blocks 216-222 of FIG. 4 represent message data records in the second session. As described before, each record contains a portion of the message, and is encrypted with the current session key (SKEY$_b$) and the previous initialization vector. The first data record in the second session (block 216) has an identifier of REC$_{n1+1}$, as it is one record after the n1 records contained in the first session. This encryption process proceeds according to the flowchart diagram of FIG. 3 and the block diagram of FIG. 4 until the producer again determines that a new session key should be rolled, continuing at block 224 and beyond. Thus, the cipher text data stream may include encrypted versions of thousands of message data records, with many new session keys embedded within.

The encryption process described above enables a data producer to create a cipher text data stream which can be processed by a consumer which knows how to decipher it. As mentioned, the consumer may process the data stream at a time which is hours or days after the data stream was created and encrypted by the producer.

Figure 5:
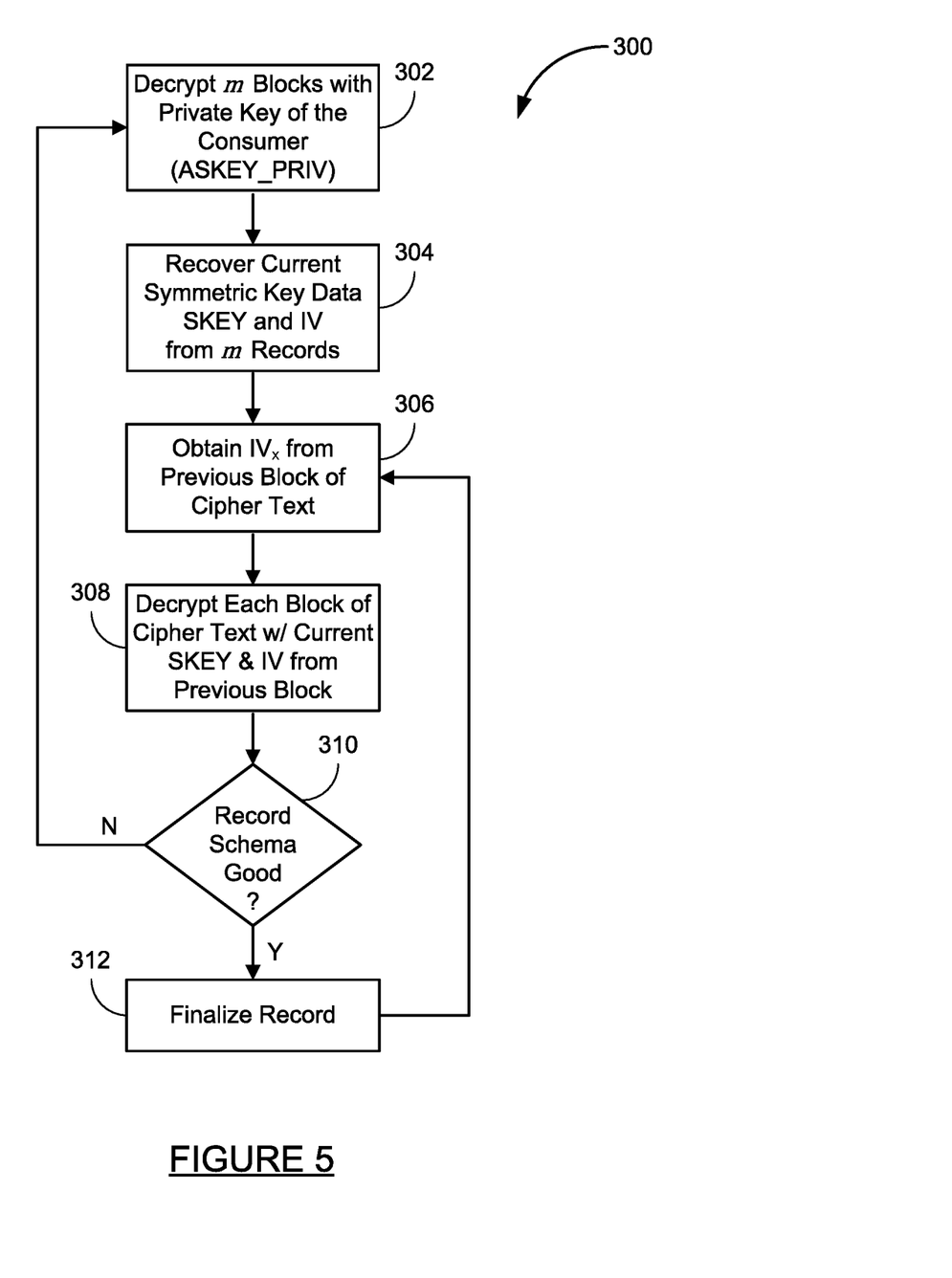
FIG. 5 is a flowchart diagram of a method used by the data consumer for decrypting a data stream received from the data producer, where the data stream may include a change of symmetric keys, according to an embodiment of the present disclosure.
Figure 6:
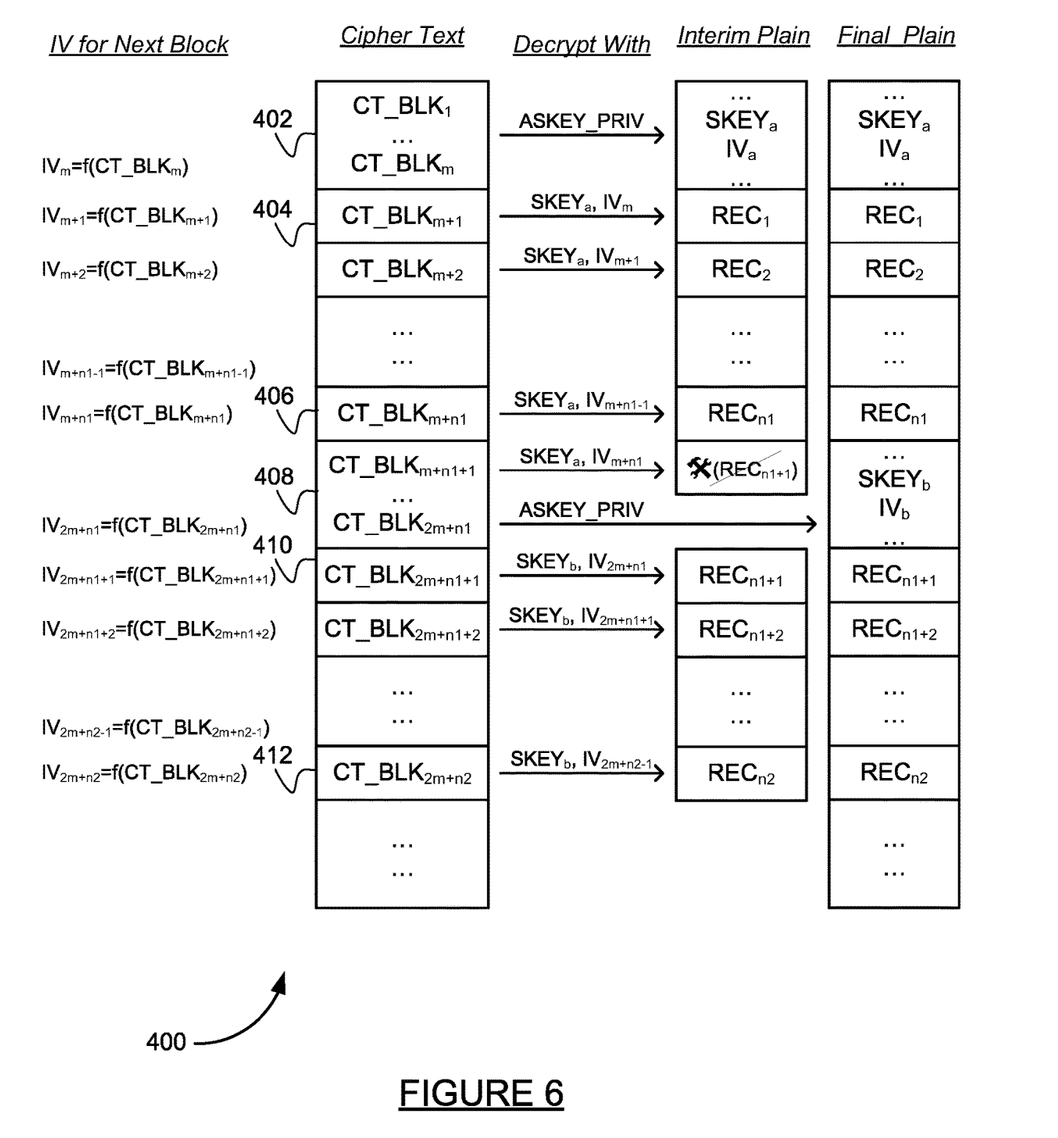
FIG. 6 is a block diagram of a decryption scheme used by the data consumer in the method of FIG. 5, according to an embodiment of the present disclosure.

FIG. 5 is a flowchart diagram 300 of a method used by the data consumer for decrypting a data stream received from the data producer, where the data stream includes a change of symmetric keys, and FIG. 6 is a block diagram 400 of a decryption scheme used by the data consumer in the method of FIG. 5, according to embodiments of the present disclosure.

At box 302, the process begins with the consumer decrypting m blocks of cipher text, containing the first session key data, using the consumer's private key (ASKEY_PRIV). These m blocks of cipher text are shown in block 402 of FIG. 6. Remember that the consumer knows the value of m, and that these m blocks of cipher text were encrypted using the consumer's public key. At box 304, the m records of plain text data are parsed to recover the current symmetric session key data ($SKEY_a$ and $IV_a$). As described previously, the session key data contained in the m records may include other values besides the new session key and initialization vector, such as a new ID Marker, as long as both the producer and consumer have a predefined protocol for exactly what will be contained in the session key records.

At box 306, an initialization vector is calculated from the previous cipher text block using the same function $f$ as was used by the producer at the box 108 of FIG. 3. In the case of the first m blocks of cipher text containing the first session key data, the initialization vector $IV_m$ is computed, as shown to the left of the block 402 of FIG. 6. At box 308, the next block of cipher text is decrypted using the current session key and the initialization vector from the previous cipher text block. Block 404 in FIG. 6 shows the cipher text block $CT\_BLK_{m+1}$ being decrypted with $SKEY_a$ and $IV_m$. The decryption results in a plain text record which is stored as an interim value as shown in the next-to-rightmost column of FIG. 6. For the $CT\_BLK_{m+1}$ of the block 404, record $REC_1$ is stored as an interim value.

At decision diamond 310, the interim value of the record ($REC_1$ in the first example) is analyzed to determine if the record schema is valid and the message digest check passes. The analysis at the decision diamond 310 is designed to distinguish between a message data record and a set of new session key records. Because the consumer knows the method used by the producer for encrypting data, and because the consumer and producer know the record schema and message digest function, the analysis at the decision diamond 310 can be used to effectively identify a switch of session keys using the cipher text data stream itself. If the analysis at the decision diamond 310 determines that the interim plain text record is a valid record, then the interim record is saved as a final plain text record at box 312, and as indicated in the rightmost column of FIG. 6.

The successful decryption of cipher text blocks into finalized data records continues through block 406 on FIG. 6, which is $CT\_BLK_{m+n1}$. It will be recalled from FIG. 4 that $CT\_BLK_{m+n1}$ was the cipher text block associated with the final message data record ($REC_{n1}$) of the first session. The next cipher text block (block 408) will contain session key data ($SKEY_b$ and $IV_b$) encrypted by the producer using the asymmetrical public key (ASKEY_PUB) of the consumer. Therefore, when the consumer tries to decrypt $CT\_BLK_{m+n1+1}$ using $SKEY_a$ and $IV_{m+n1}$, the resulting interim plain text record will not pass the analysis at the decision diamond 310, because the wrong key data will be used. This bad data in the interim record is a trigger to indicate to the consumer that a different action must be taken—namely, to loop back from the decision diamond 310 to the box 302 and decrypt m blocks of cipher text using the consumer's private key (ASKEY_PRIV). This step will produce the new session key data ($SKEY_b$ and $IV_b$).

The next cipher text block (block 410) contains $CTBLK_{2m+n1+1}$, which is the encrypted version of the first record in the second session ($REC_{n1+1}$) from the producer. Because the consumer has just recovered new session key data, the new key $SKEY_b$ will be used, along with the initialization vector ($IV_{2m+n1}$) from the last block of the just-received session key cipher text blocks, to decrypt $CT\_BLK_{2m+n1+1}$ into interim text record $REC_{n1+1}$. The interim text record $REC_{n1+1}$ will pass the analysis at the decision diamond 310 as a valid record, and will be stored as a finalized record. The decryption will continue using $SKEY_b$ until the end of the second session at block 412 containing $CT\_BLK_{2m+n2}$ which decrypts to plain text record $REC_{n2}$. The decryption process continues as long as more cipher text blocks remain in the data stream, with automatic detection and recovery of new session keys as they are encountered by the consumer, wherever they are placed by the producer.

When the end of the cipher text data stream is reached, or when recovered data records are reconstructed into one or more complete messages by the consumer, then the message or messages (finalized records $REC_1$-$REC_{n1}$ and $REC_{n1+1}$-$REC_{n2}$) can be processed and acted upon by the consumer. For example, the first device (producer) could be a UAV which is autonomously flying a monitoring or reconnaissance mission. The UAV is programmed to log or record anomalies or noteworthy events—such as a significant change in barometric pressure in a hurricane, for example. The UAV may or may not be able to immediately transmit the message to a ground station (second device—consumer); therefore, it is not possible to use a real-time session key replacement process. If the producer encodes the message data stream with session keys which are changed on an ad hoc basis, then the consumer must be able to recover the session keys from the data stream itself at the time of decoding.

Other examples can easily be envisioned where the disclosed data assisted key switching would be beneficial. For example, vehicles produced by a certain manufacturer can record data (such as a low tire pressure, a diagnostic trouble code, etc.) and transmit the data to a vehicle service center when the vehicle has Wi-Fi or other communications available. In any of these scenarios, actions can then be taken by the second device based on the message—such as changing a flight plan of the UAV, sending a message to a driver, or updating software or firmware on the vehicle.

It is to be understood that the software applications and modules described above are executed on one or more computing devices having a processor and a memory module. For example, the data encryption process of the flowchart diagram 100 may be executed on a controller or processor in the UAV or vehicle using predefined encryption algorithms which are applied to messages or log entries. Likewise, the consumer decryption process of the flowchart diagram 300 may be executed on a server computer in a base station or service station using predefined decryption algorithms operating on a message data stream received from the UAV or vehicle. The first device and the second device also must have a means of communications—which may be hardwired or any wireless technology.

The techniques discussed above for data assisted key switching in hybrid cryptography offer several advantages over traditional methods. These advantages include the performance and security of hybrid encryption while sending all message and session key data over a single cipher text data stream—avoiding the need for a separate key distribution process and data channel. The disclosed techniques also allow the decryption process to occur at a time arbitrarily later than encryption—thus enabling complete flexibility in the operation of the first device (UAV or vehicle) and its communications with the second device.

The foregoing discussion discloses and describes merely exemplary embodiments of the methods and systems. One skilled in the art will readily recognize from such discussion and from the accompanying drawings and claims that various changes, modifications and variations can be made therein without departing from the spirit and scope of the disclosed techniques as defined in the following claims.

What is claimed is:

1. A method for cryptographic communication between devices, said method comprising:
providing a producer device including a processor configured to perform steps including: computing an initialization vector (IV) from an immediately previous cipher text block using a predefined IV function, creating a session key data comprising at least a symmetric key and the IV, asymmetrically encrypting the session key data using a public key of a consumer, symmetrically encrypting message data records using the session key data, and placing the encrypted session key data and the encrypted message data records in a single cipher text data stream, wherein new session key data comprising new symmetric key and new IV is encrypted and placed in the single cipher text data stream on an ad hoc basis; and
providing a consumer device including a processor and receiving the single cipher text data stream from the producer device, the processor of the consumer device is configured to perform steps including: decrypting the encrypted session key data using a private key of the consumer to recover the session key data, decrypting the encrypted message data records using the recovered session key data to obtain decrypted message data records, analyzing each decrypted message data record of the decrypted message data records to determine whether the each decrypted message data record has valid schema and message digest according to predefined criteria, storing each decrypted message data record of the decrypted message data records which is determined to be valid, and decrypting the encrypted new session key data using the private key of the consumer to recover the new session key data in response to determining a decrypted message data record of the decrypted message data records is invalid.

2. The method according to claim 1 wherein the asymmetrically encrypting the session key data includes placing the session key data into a first number of data records and encrypting the first number of data records into a first number of cipher text blocks, where the first number is predetermined and known to both the producer device and the consumer device.

3. The method according to claim 2 wherein the decrypting the encrypted session key data by the consumer device includes decrypting the first number of cipher text blocks into the first number of data records and recovering the session key data from the first number of data records.

4. The method according to claim 1 wherein the predefined IV function is known to both the producer device and the consumer device.

5. The method according to claim 1 wherein the predefined criteria includes a record size, a record schema defining record fields and formats, and a message digest type.

6. The method according to claim 5 wherein the predefined criteria are known to both the producer device and the consumer device and are used by the producer device to create the message data records and used by the consumer device to analyze the decrypted message data records.

7. The method according to claim 5 wherein the session key data further includes definition of the predefined criteria to be used in an upcoming session.

8. The method according to claim 1 wherein new session key data is provided by the producer device based on conditions including an end of a message, an elapsed time for a current session exceeding a threshold, and an off/on power cycle of the producer device.

9. The method according to claim 1 further comprising reconstructing one or more messages by the consumer device by sequentially arranging stored decrypted message data records.

10. The method according to claim 9 wherein the producer device is an unmanned aerial vehicle (UAV) and the consumer device is a base station, and further comprising taking an action by the base station based on the one or more messages, wherein the action includes issuing new mission instructions to the UAV.

11. A method for cryptographic communication between devices, said method comprising:
defining a data record schema including a record size, a set of data fields and valid content, and a type of message digest;
providing a first device having a processor configured to perform steps of:
creating a message to be communicated,
dividing the message into a plurality of message data records,
creating a set of current session key data for symmetric encryption,
placing the current session key data in a first number of data records, where the first number is predetermined to provide space for the current session key data,
asymmetrically encrypting the first number of data records using a known public key of a second device to obtain a first number of cipher text blocks and placing the first number of cipher text blocks in a cipher text data stream,
computing a current initialization vector (IV) from an immediately previous cipher text block using a known IV function, wherein the current session key data comprising at least the current IV and a current session key,
symmetrically encrypting a message data record of the plurality of message data records using the current session key and the current IV to obtain a first cipher text block and placing the first cipher text block in the cipher text data stream,
determining whether replacement of the current session key data is indicated,
recursively computing a new IV and symmetrically encrypting a new message data record of the plurality of message data records using the current session key and the new IV in response to determining replacement of the current session key data is not indicated, and
returning to creating a set of new session key data comprising at least a new session key in response to determining replacement of the current session key data is indicated,
asymmetrically encrypting the new session key data using the known public key of the second device, placing the encrypted new session key data into the cipher text data stream; and providing the second device in communications with and receiving the cipher text data stream from the first device, said second device having a processor configured to perform steps of:

asymmetrically decrypting the first number of cipher text blocks using a private key of the second device and recovering the current session key data from the first number of data records, computing the current IV from an immediately previous received cipher text block using the known IV function, symmetrically decrypting the first cipher text block using the current session key and the current IV and saving a result of the symmetrically decrypting of the first cipher text block in an interim data record, analyzing the interim data record to determine whether the interim data record is valid according to the data record schema, storing the interim data record as a finalized message data record in response to determining the interim data record is valid, returning to computing the new IV in response to determining the interim data record is valid, and returning to asymmetrically decrypting the first number of cipher text blocks and recovering the new session key data in response to determining the interim data record is not valid.

12. The method according to claim 11 wherein the data record schema, the first number of data records and the known IV function are commonly known to both the first device and the second device.

13. The method according to claim 11 further comprising reconstructing one or more messages by the second device by sequentially arranging finalized message data records, and further comprising taking an action by the second device based on the one or more messages.

14. A cryptographic communications system, said communications system comprising:

a producer device including a hardware processor and a memory, said hardware processor of the producer device configured to perform steps including: computing an initialization vector (IV) from an immediately previous cipher text block using a predefined IV function, creating a session key data comprising at least a symmetric key and the IV, asymmetrically encrypting the session key data using a public key of a consumer, symmetrically encrypting message data records using the session key data, and placing the encrypted session key data and the encrypted message data records in a single cipher text data stream, wherein new session key data comprising new symmetric key and new IV is encrypted and placed in the single cipher text data stream on an ad hoc basis; and a consumer device including a hardware processor and a memory, said consumer device receiving the single cipher text data stream from the producer device, the hardware processor of the consumer device is configured to perform steps including: decrypting the encrypted session key data using a private key of the consumer to recover the session key data, decrypting the encrypted message data records using the recovered session key data to obtain decrypted message data records, analyzing each decrypted message data record of the decrypted message data records to determine whether the each decrypted message data record has valid schema and message digest according to predefined criteria, storing each decrypted message data record of the decrypted message data records which is determined to be valid, and decrypting the encrypted new session key data using the private key of the consumer to recover the new session key data in response to determining a decrypted message data record of the decrypted message data records is invalid.

15. The communications system according to claim 14 wherein the asymmetrically encrypting the session key data includes placing the session key data into a first number of data records and encrypting the first number of data records into a first number of cipher text blocks, where the first number is predetermined and known to both the producer device and the consumer device, and wherein the decrypting the encrypted session key data by the consumer device includes decrypting the first number of cipher text blocks into the first number of data records and recovering the session key data from the first number of data records.

16. The communications system according to claim 14 wherein the predefined IV function is known to both the producer device and the consumer device.

17. The communications system according to claim 14 wherein the predefined criteria includes a record size, a record schema defining record fields and formats, and a message digest type, and wherein the predefined criteria are known to both the producer device and the consumer device and are used by the producer device to create the message data records and used by the consumer device to analyze the decrypted message data records.

18. The communications system according to claim 14 wherein new session key data is provided by the producer device based on conditions including an end of a message, an elapsed time for a current session exceeding a threshold, and an off/on power cycle of the producer device.

19. The communications system according to claim 14 wherein the producer device is an unmanned aerial vehicle (UAV) and the consumer device is a base station, and wherein the consumer device is further configured to reconstruct one or more messages by sequentially arranging stored decrypted message data records, and further configured to take an action based on the one or more messages, the action includes issuing new mission instructions to the UAV.

* * * * *